May 6, 1941.  C. A. WARNKE  2,240,970
VINE LIFTER
Filed Sept. 28, 1939  2 Sheets-Sheet 1
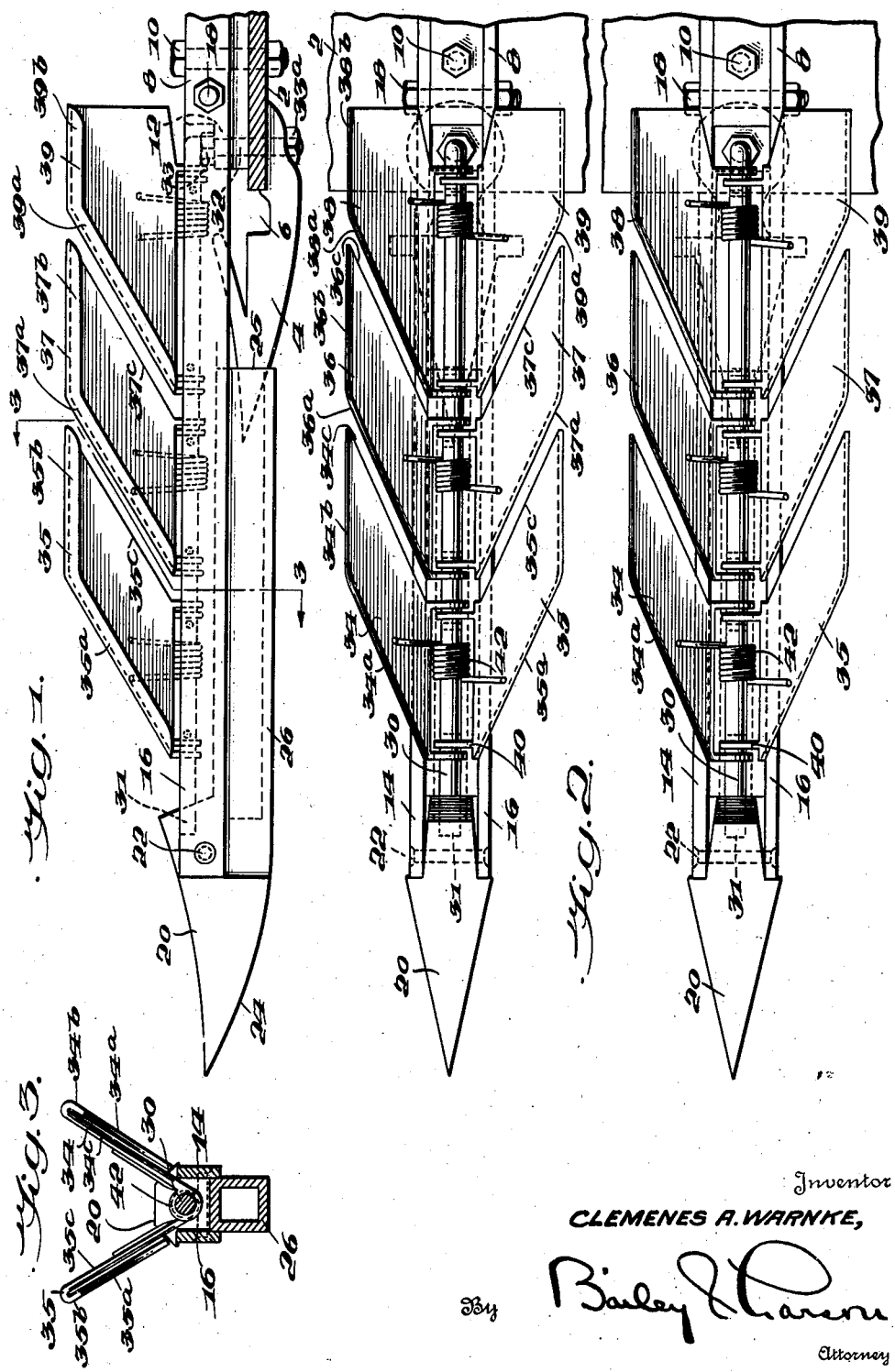
Inventor
CLEMENES A. WARNKE,
By
Attorney May 6, 1941.  C. A. WARNKE  2,240,970
VINE LIFTER
Filed Sept. 28, 1939  2 Sheets-Sheet 2
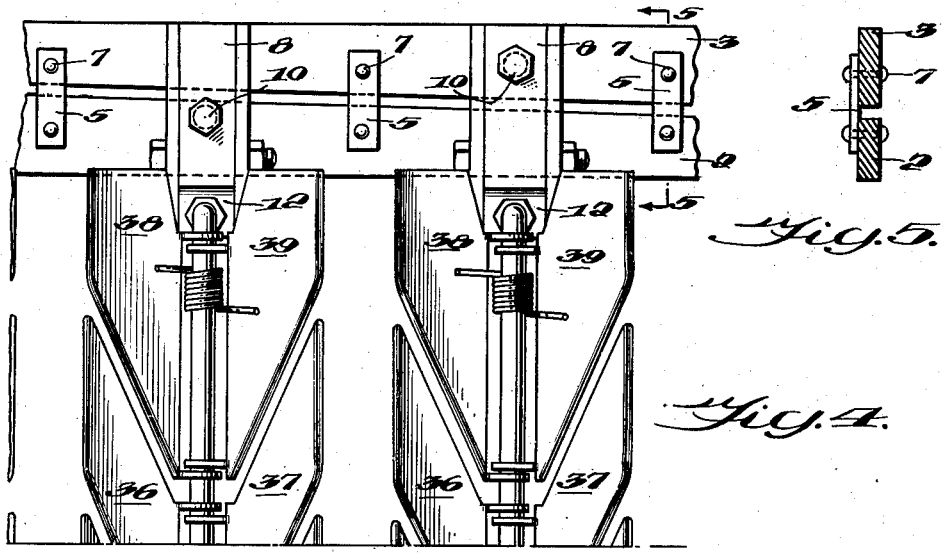
Fig. 5.
Fig. 4.
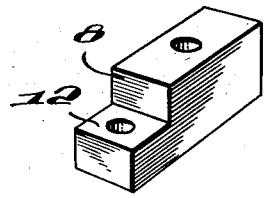
Fig. 7.
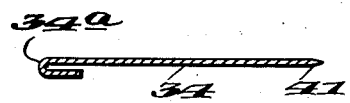
Fig. 6.
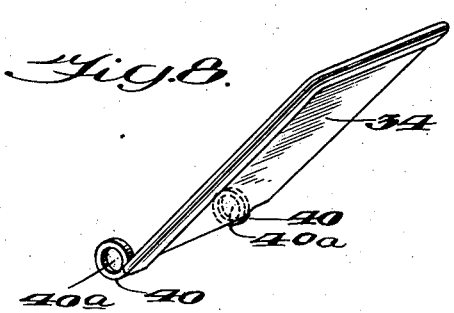
Fig. 8.
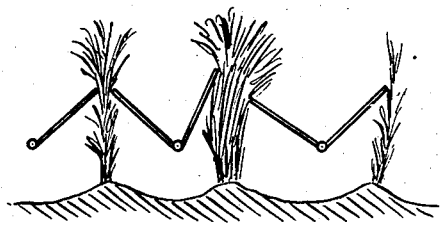
Fig. 9.
Inventor
CLEMENES A. WARNKE,
By Bailey & Larson
Attorney Patented May 6, 1941

2,240,970

UNITED STATES PATENT OFFICE 2,240,970

VINE LIFTER

Clemenes A. Warnke, Grand Rapids, Mich.

Application September 28, 1939, Serial No. 296,997

10 Claims. (Cl. 56—312)

This invention is directed to a vine lifter, and more particularly to an apparatus for lifting vines having pods attached thereto, in advance of the cutter blades of a mowing machine so that the pods are not cut thereby.

Hitherto many devices have been used for the purpose of lifting bent-over stalks of grain or vines in advance of the cutter blades of a mowing machine. These devices generally consist of rigid upwardly and rearwardly inclined rods mounted in front of the cutter blades of the machine. They do not successfully lift the pods hanging on the bean vines so that the pods are not cut. This is because the bean pods are relatively heavy, and because of their weight, tend to slip off of the inclined rods of the machine into the path of the cutter blade. Such mutilation of the pods by the cutting is, of course, undesirable as the pods are rendered worthless.

It is an object of this invention to lift from the ground, and protect, the pods on bean vines so that they are not cut by the mowing machine.

Another object of the invention is to provide a protecting pathway for the passage of bean pods from the time they are lifted from the ground to after they are cut by the mowing machine.

Another object of the invention is to provide an apparatus which automatically adjusts itself to thick or thin rows of bean vines so that all pods are lifted and protected from the cutter blade as the mower progresses along a row of vines.

Generally, these objects of the invention are obtained by mounting extensions in front of the cutter bar of a mowing machine, which extensions lie on either side of the row of vines. Each extension has pairs of movable wings attached thereto. The pods on the vines are lifted above the level of the cutter blade by each extension, and the pods fall in between the movable wings, and are restrained by the wings from falling into the path of the cutter blade. The movability of the wings allows them to give and to adjust themselves to the width, or the thickness, of the row of vines being mowed.

The means by which the objects of the invention are obtained are more fully described with reference to the accompanying drawing, in which:

Fig. 1 is a side elevational view of a lifting extension attached to the cutting bar of a mowing machine.

Fig. 2 is a plan view of two adjacent lifting extensions attached to the cutting bar of the mower;

Fig. 3 is a cross-sectional view on the line 3—3 of Fig. 1.

Fig. 4 is a partial plan view of the lifting extensions attached to a reinforced cutting bar of the mower.

Fig. 5 is a cross sectional view on the line 5—5 of Fig. 4.

Fig. 6 is a cross sectional view of one of the novel lifting wings.

Fig. 7 is a perspective view of a block used for attaching an extension to a cutting bar.

Fig. 8 is a perspective view of one of the lifting wings, and

Fig. 9 is a diagrammatic view illustrating the angles assumed by the wings when contacting thick and thin rows of vines.

In Figs. 1 and 2, the cutter blade supporting bar 2 is that of an ordinary mowing machine. Secured forwardly of this bar are the usual shoes 4, which guide the stalks into the path of the cutter blade which operates in the space 6.

The novel vine lifting and pod protecting extensions of this invention are each secured to bar 2, and extend above and forwardly of shoes 4. Each extension is composed of a block 8, note Fig. 7, secured by bolt 10 to cutter bar 2. As bar 2 is commonly of relatively small size, and is tapered outwardly from the end supported by the mowing machine, it may be reinforced by a parallel bar 3, note Fig. 4, lying in the same horizontal plane as bar 2, and secured to bar 2 by links 5 and bolts 7 and to which block 8 may also be secured. Block 8 has a forwardly extending integral tongue 12, which has an opening therein for a purpose later described. Projecting forwardly from each side of block 8 are plates 14 and 16, respectively. These plates are secured to block 8 by bolt 18. The outer ends of plates 14 and 16 are secured to each other and to a second shoe 20 by rivet 22. Shoe 20 has a wedge-shaped forward portion, with a rounded bottom side 24 which is adapted to be pushed either slightly above or along the surface of the ground by forward movement of the mower. From this forward portion the shoe 20 is continued rearwardly as a box-like section 26, the rear end 25 of which fits over the nose of shoe 4. Thus section 26 is kept centered with respect to shoe 4, and the box section provides a rigid structure which is not deflected when pushed forwardly against the pressure of the ground or the vines.

Plates 14 and 16 extend above the upper surface of box section 26 and form a channel-shaped space thereabove. A rod 30 lies within this channel-shaped space, the forward end of the rod being held within a bore 31 in the rear end of shoe 20, while the other end of the rod is turned downwardly at 32, and passed through an opening in the tongue 12 of block 8. Projection 32 takes the place of the bolt normally required to secure shoe 4 to bar 2, the projection and shoe being secured by nuts 33 and 33a threaded, respectively, upon projection 32. Rod 30 supports a series of pairs of lightweight movable plates or wings 34, 35; 36, 37; and 38, 39. Each wing is movably secured to rod 30 by means of hinges 40 having holes 40a, Fig. 8 through which rod 30 projects. Outward movement of the wings is limited by their bearing upon either plate 14 or 16. Inward movement of the wings is controlled by springs 42 coiled about rod 30, and which have their free ends extended to bear against oppositely positioned wings. As shown, the leading and trailing edges of the respective wings are inclined upwardly and rearwardly for the purpose of facilitating the upward lift of vines from the ground. The leading edges have downwardly projecting flanges 34a to 39a, respectively, and the top edges are flanged downwardly at 34b to 39b, respectively. These flanged edges form blunt surfaces over which the vines can easily slide without jamming or tearing. The rear edges 34c to 37c, respectively, are formed as knife edges 41, Fig. 6 so that when the mower is moved rearwardly, as when being maneuvered about a field, the vines overhanging the wings are cut before they can jam in between the lightweight wings to distort and break them.

As shown in Fig. 2, a plurality of lifting extensions are secured to the cutting bar 2 of the mower. The extensions are spaced from each other so as to lie on opposite sides of the row of vines being cut, the upper edges of the wings on two adjacent extensions almost touching each other. As the mower advances along a row of vines, the shoes 20 of adjacent extensions move along opposite sides of the stalks and give initial lift to the vines and pods which overlie the furrow. The undersurface 24 of shoe 20 can ride along the surface of the ground, if desired, and thus ensure that all vines are lifted. As the extensions are pushed forwardly the vines are further lifted by the inclined leading edges of the wings. The heavy pods carried by the vines are thus lifted upwardly and fall in between the pair of wings 34 and 35 upon each lifting extension. Plates 14 and 16 prevent the vines from becoming entangled about rod 30 and springs 42, so that free movement of the wings is insured. As shown in Fig. 9, the movable wings in their normal outward position have their outer edges lying very close to the stalks of a thin row of vines, but should the row increase in thickness, the movable wings move inwardly against the pressure of springs 42 under the pressure of the vines passing between the wings. This inward movement causes the upper edges of the wings to move slightly upwardly and gives a further lifting effect to the vines. The pods of course lie in between movable wings 34 and 35 of the same lifting extension, and as the mower moves still further forward, these pods are passed between movable wings 36 and 37, and then between the wings 38 and 39. As the pods are supported above the cutting blade in space 6 by wings 38 and 39, only the stalks of the vines are cut and the cut portions of the vines are pushed rearwardly over the cutter bar with the pods uninjured.

This invention provides the advantages in that the pods are not only picked up, but that the cutter bar extensions through the movable wings insure that the pod laden stems for either a thick or a thin row or a row of varying thickness are always picked up and held above the cutter blade until the pods have passed over the mower. Because of the blade-like form of the wings, and because of the closeness of the wings on each wing extension, the pods have no chance of falling away from the extension and into the path of the cutting blade. Thus, a row of vines can be cut quickly with all the vines being lifted from the ground and without the pods being injured. Another advantage of the invention lies in the fact that the heavy pods which rest upon the ground are picked up and cut while they are still attached to the vine so that no loss is occasioned by the mower cutting above the pod and leaving the pod on the ground where it cannot be picked up by the rake used to gather the vines together after they have been mowed.

Having now described a means by which the objects of this invention may be obtained, what I claim as new and desire to secure by Letters Patent is:

1. A vine lifting device for a mowing machine comprising means movable longitudinally of a row of vines for lifting said vines from the ground and vertically and transversely swinging resilient means for holding the vines above the ground until after they have passed over a cutting blade.

2. A vine lifting extension for a mowing machine comprising a bar extension and a plurality of plate-like wings mounted for vertical swinging movement upon said bar.

3. In a mowing machine, a plurality of extensions projecting forwardly of the cutting blade, and a plurality of movable wings mounted for vertical swinging movement upon each extension.

4. In a mowing machine, means movable longitudinally of a row of vines for lifting the vines from the ground in advance of the cutting bar and resilient vertically and transversely swinging means for pressing against the stems of the vines and holding the ends thereof in a path spaced above the cutting blade of the mower.

5. A vine lifting extension for a mowing machine comprising a member adapted to be secured at one end to the mowing machine, a rod mounted in spaced relation to said member, pairs of wings projecting outwardly of opposite sides of said member, and means movably mounting said wings upon said bar.

6. A vine lifting mechanism for a mowing machine comprising a plurality of extensions secured to the cutting bar of said machine, each of which is adapted to lie in between adjacent rows of vines, and a series of pairs of plate-like wings movably mounted upon each extension, the wings in each pair of wings projecting outwardly from opposite sides of its extension, said series of wings forming a pathway for vine pods from adjacent the forward end of each extension to a point above the cutting bar of said machine.

7. A mechanism as in claim 6 further comprising means for resiliently pressing each wing outwardly from said extension, and means for limiting the outward movement of each wing.

8. A wing element for a vine lifting mechanism of the type described comprising a quadrilaterally shaped plate, and blunt edge means on the leading and top edges of said plate.

9. A wing element as in claim 8 further comprising a knife edge on the trailing edge of said plate.

10. A wing element as in claim 8 further comprising hinge means upon the lower edge of said plate.

CLEMENES A. WARNKE.